United States Patent [19]

Kitamura et al.

[11] 4,020,291
[45] Apr. 26, 1977

[54] SYSTEM FOR TIME COMPRESSION AND EXPANSION OF AUDIO SIGNALS

[75] Inventors: Masatsugu Kitamura; Harukuni Kobari, both of Fujisawa, Japan

[73] Assignee: Victor Company of Japan, Limited, Yokohama, Japan

[22] Filed: Aug. 20, 1975

[21] Appl. No.: 606,228

[30] Foreign Application Priority Data

| Aug. 23, 1974 | Japan | 49-96170 |
| Aug. 28, 1974 | Japan | 49-97981 |
| Aug. 30, 1974 | Japan | 49-98927 |
| Aug. 23, 1974 | Japan | 49-100210 |

[52] U.S. Cl. .................. 179/15.55 T; 360/8
[51] Int. Cl.² ..................... H04B 1/66; G11B 5/00
[58] Field of Search .............. 360/8; 179/15.55 T, 179/15.55 R

[56] References Cited

UNITED STATES PATENTS

| 3,831,192 | 8/1974 | Gross et al. | 360/8 |
| 3,855,424 | 12/1974 | Tharmaratnam | 360/8 |
| 3,860,760 | 1/1975 | Rittenbach | 360/8 |
| 3,873,778 | 3/1975 | Mutsuura | 179/15.55 T |
| 3,878,560 | 4/1975 | Ramage | 360/8 |

*Primary Examiner*—Jay P. Lucas
*Attorney, Agent, or Firm*—Holman & Stern

[57] ABSTRACT

A system for time compression and expansion of audio signals comprises a filter for filtering the fundamental frequency component of an input signal reproduced at a speed differing from that at the time of recording, first and second memory devices for carrying out writing in or memorizing and reading out at speeds in accordance with the frequency of applied clock pulses, a control signal forming circuit for forming gate control signals and clock pulse signals of different frequency from the output fundamental frequency component of the filter in synchronism with the pitch period thereof, and gates controlled by the gate control signals to pass or not pass the output signals of the first and second memory devices. A time compressed or expanded signal synchronized with the pitch period of the fundamental frequency component of the input signal is led out through these gates.

7 Claims, 8 Drawing Figures

SYSTEM FOR TIME COMPRESSION AND EXPANSION OF AUDIO SIGNALS

BACKGROUND OF THE INVENTION

This invention relate generally to systems for time compression and expansion of signals. More particularly, the invention relates to a signal time compression and expansion system wherein, in restoring a frequency spectrum of a signal reproduced from a recording and reproducing apparatus to the original at a speed different from that in recording, the reproduced audio signal is divided into intervals made to coincide with a pitch period thereof and, after being frequency compressed or expanded, is connected together thereby to obtain a restored signal whose formant frequency is equal to that of the original signal.

It has been common practice in recording audio signals on a recording medium at ordinary speeds to reproduce the recorded signals at higher or lower speeds or to quicken or retard the tempo of reproduced speech voices as required. This method has sometimes been employed in consolidating the recorded speech contents delivered at a lecture meeting or at a round-table discussion, in the case of translating into a foreign language by listening to a recorded and reproduced discourse spoken in another language, in language lessons, and in other applications. This method has been used sometimes by busy persons and blind persons.

Merely switching one tape speed to another of an ordinary tape recorder may succeed in changing the tempo of a recorded speech, but this varies the pitch of voice sound and tone quality as well. This makes a reproduced speech indistinct and the speech content difficult to comprehend. Thus, there arises the need for a method whereby the tempo of a talk can be varied without accompaniment of variation in tone or sound quality.

There has been conventional method for meeting such a demand which comprises extracting a part of the original signals and slicing the remainder to such a degree that the speech content can still be understood when shortening the reproduction time interval, while inserting blank portions or reproducing the same portion repeatedly when the reproduction time is to be prolonged. With this conventional method, write-in or store and read-out operations are performed alternately and repeatedly by use of a single memory device. For this reason, the reproduced signal is liable to become intermittent or discontinuous, and its waveform envelope becomes at times a so-called tone-burst waveform.

A problem accompanying this method is that the tone quality of a reproduced sound is of poor quality accompanied by disturbances and interruptions.

Another problem encountered in the practice of this method is that memorized or stored and readout signals occupy only a part of the input signal, and in the case where a tape is played back at a speed which is twice the recording speed, for instance, stored and readout signals correspond to only one-third of the palyback signal, resulting in a great information loss, and hence the articulation of the reproduced voice is considerably sacrificed.

SUMMARY OF THE INVENTION

Accordingly, it is an object of the present invention to provide a novel and useful time compression or expansion system for signals in which the above described limitations of the prior art are overcome.

Another and more specific object of the invention is to provide a system for carrying out time compression and expansion of an audio signal in synchronism with the pitch period of an input audio signal reproduced from a tape. According to the system of the invention, a time compressed and expanded and restored signal of high articulation and good tone quality of the same formant frequency and pitch period as the original recorded signal is obtained.

Another object of the invention is to provide a system capable of carrying out time compression an expansion of an audio signal with a formant frequency and pitch period substantially equal to those of the original recorded signal and, moreover, with any time compression and expansion rate.

A further object of the invention is to provide a system in which a timing signal which is in synchronism with the pitch period of an input audio signal reproduced from a tape and, moreover, is generated with any phase is obtained, and, by utilizing this timing signal, the input audio signal is time compression and expansion processed with any phase and in synchronism with the pitch period.

Other objects and further features of the invention will be apparent from the following detailed description with respect to preferred embodiments of the invention when read in conjunction with the accompanying drawings.

BRIEF DESCRIPITON OF THE DRAWINGS

In the drawings:

FIG. 1 is a block schematic diagram showing the essential organization of a first embodiment of the time compression and expansion system for audio signals according to the present invention;

FIGS. 2(A) through 2(J) are waveform graphs respectively indicating the waveforms of signals at various parts of the system shown by block diagram in FIG. 1;

Figure 4:
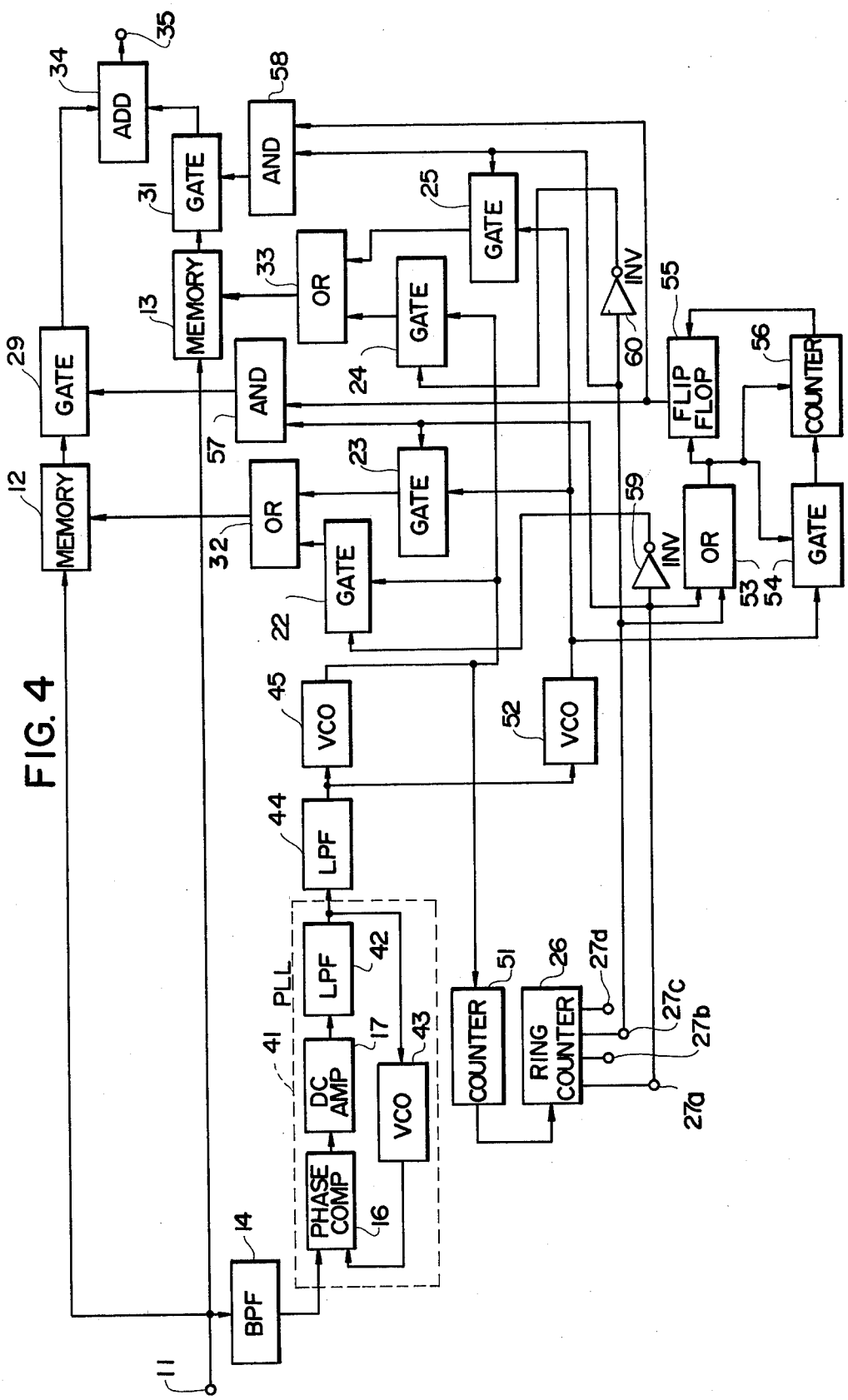
FIG. 4 is a block schematic diagram showing the essential organization of a third embodiment of the time compression and expansion system for audio signals according to the invention.
Figure 6:
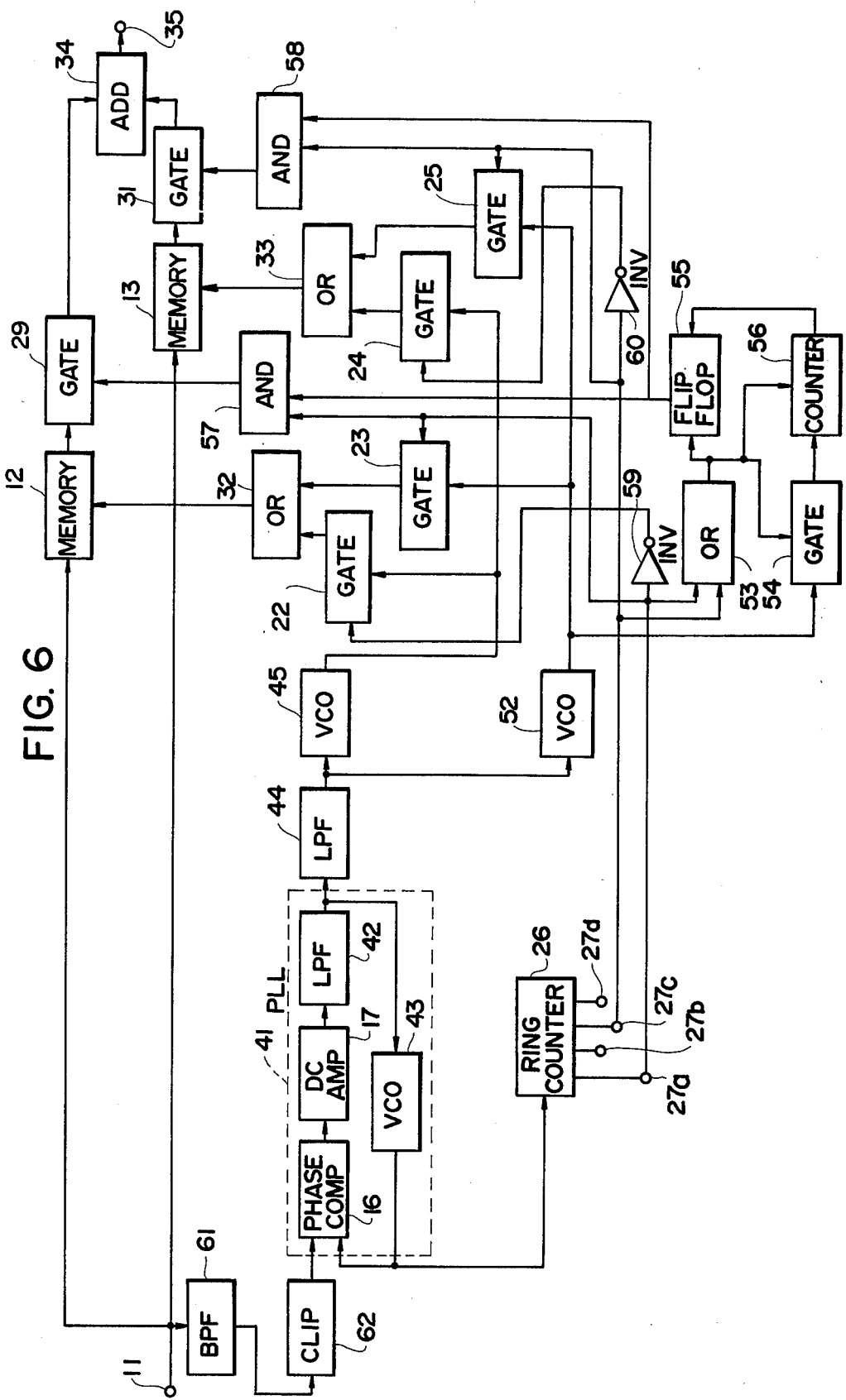
Figure 7:
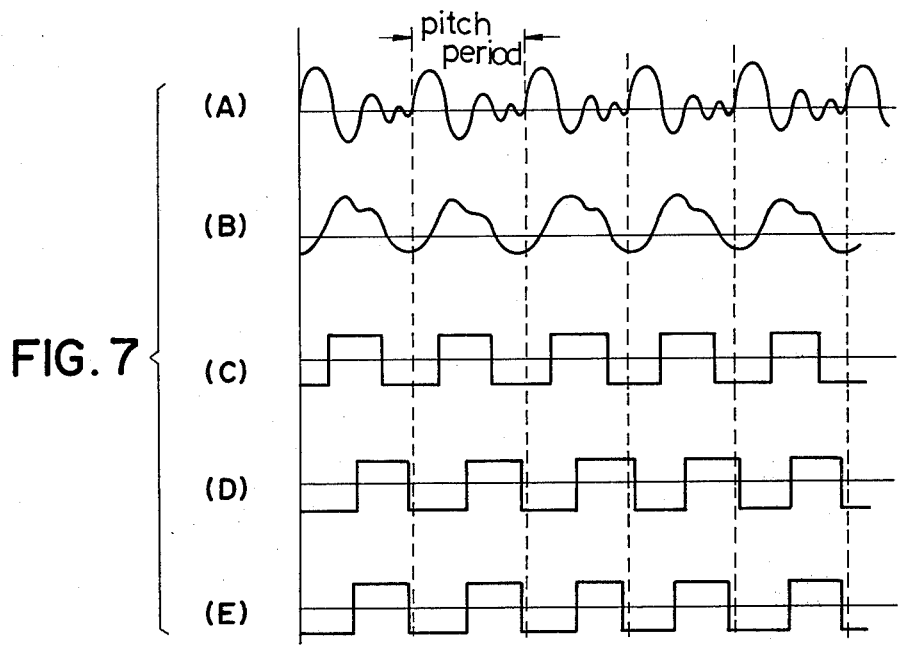
Figure 8:
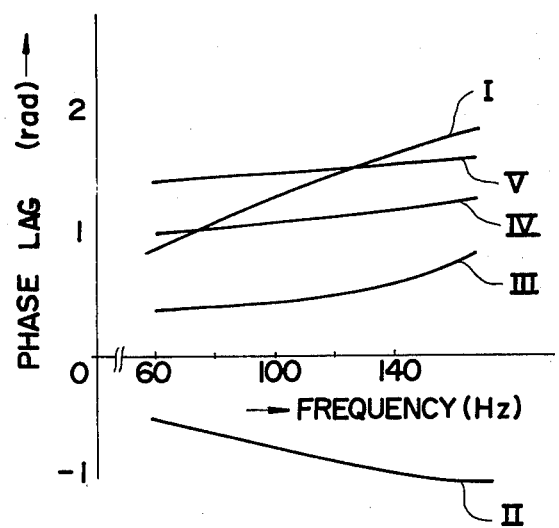

FIGS. 5(A) through 5(E) are respectively signal waveform graphs for a description of the operation of the system illustrated in FIG. 4;

FIG. 6 is a block schematic diagram showing the essential organization of a fourth embodiment of the time compression and expansion system for audio signal according to the invention;

FIGS. 7(A) through 7(E) are graphs respectively indicating the waveforms of signals at various parts of the system illustrated in FIG. 6; and FIG. 8 is a graph for a description of phase lag characteristics of signals.

DETAILED DESCRIPTION

Figure 1:
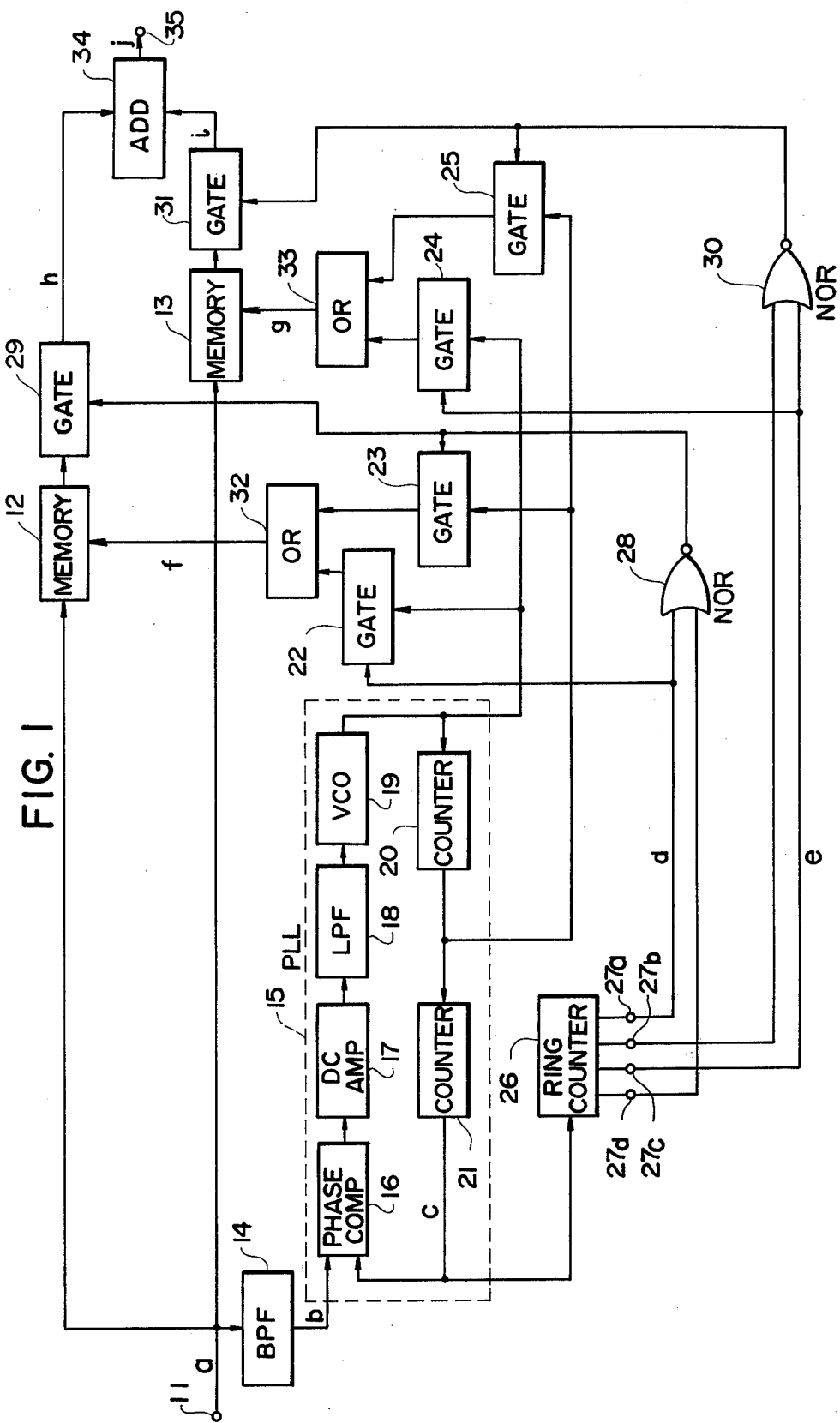

Referring first to FIG. 1, the first embodiment of the time compression and expansion system for audio signals according to the present invention will be described with respect to the case, for example, where a signal recorded on a tape is reproduced by means of a tape recorder by running the tape at twice the speed at the time of recording, and then, time compression to one-half is carried out.

Figure 2:
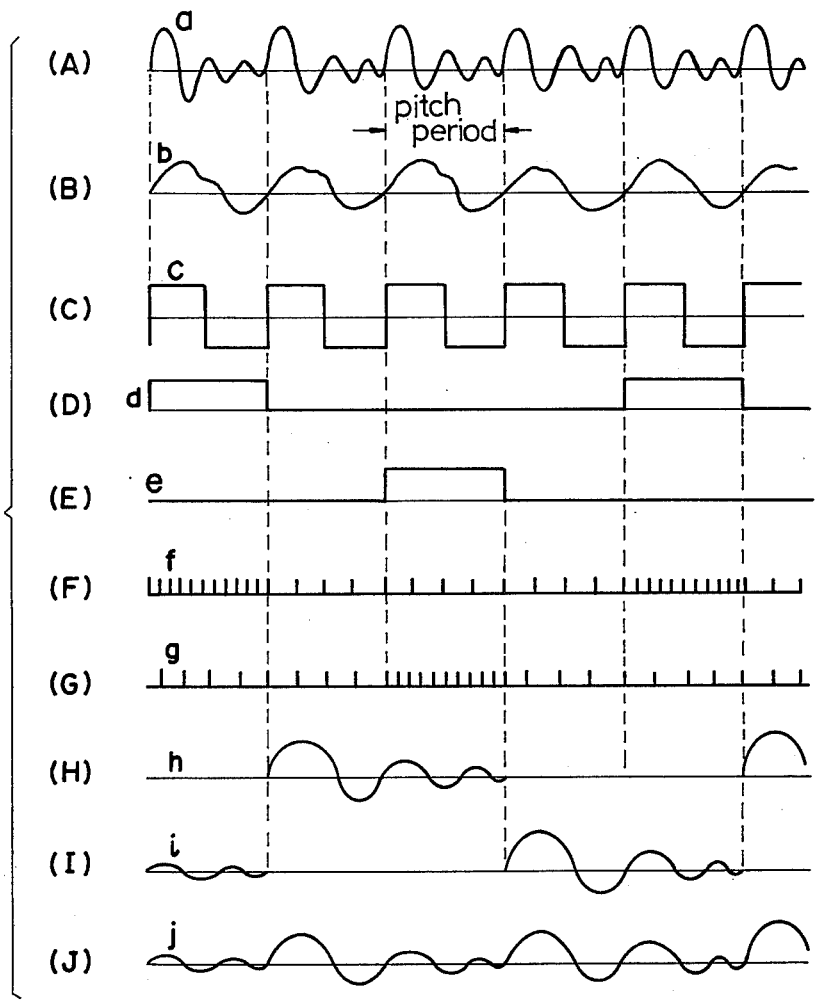

A signal $a$ of a waveform as indicated in FIG. 2(A), which has been thus reproduced from the tape caused to travel at twice the speed at the time of recording by means of a tape recorder is introduced into the system through an input terminal 11 and is supplied to memory devices 12 and 13 and to a band-pass filter 14. Here, for each of the memory devices 12 and 13, an analog shift register comprising M=512 elements is employed. In each of the memory devices 12 and 13, the speeds of writing in or storing reading out can be varied in accordance with clock-pulse frequencies.

The signal $a$ supplied to the band-pass filter 14 is here subjected to selective passing of its fundamental frequency component, whereupon a signal $b$ of the waveform shown in FIG. 2(B) is obtained as output. This signal $b$ is fed to a phase comparator 16 of a phase locked loop (hereinafter referred to by the abbreviation PLL) 15, where it undergoes phase comparison with a signal $c$ as indicated in FIG. 2(C) from a counter 21 described hereinafter. The phase comparison error voltage thus obtained from the phase comparator 16 is passed respectively through a DC amplifier 17 and low-pass filter 18 and supplied to a voltage controlled oscillator (hereinafter abbriviated VCO) 19 thereby to control the oscillation frequency to the VCO 19. In this first embodiment, the output center frequency of the VCO 19 at the time when the PLL 15 is operating in synchronism is so selected that it will become M times the fundamental frequency of the signal $b$ from the band-pass filter 14.

The output oscillation signal of the VCO 19 is supplied to gates 22 and 24 and, at the same time, to a counter 20, where its frequency is halved. The output signal pulse of the counter 20 is supplied to gates 23 an 25 and, at the same time, to the above mentioned counter 21, where its frequency is further divided to 2/M of its value and is rendered into a frequency equal to the fundamental frequency (1/pitch period) of the signal $b$. The output signal of this counter 21 is supplied to the above mentioned phase comparator 16 and, at the same time, to a 4-stage ring counter 26.

The above mentioned phase comparator 16, DC amplifier 17, low-pass filter 18, VCO 19, and counters 20 and 21 constitute the PLL 15. The PLL 15 operates in a manner such that the phase difference between the phase of the signal $b$ from the band-pass filter 14 and the phase of the signal $c$ from the counter 21 becomes zero, whereby it synchronizes with the signal $b$, and from the VCO 19 of the PLL 15, a signal of a specific frequency (a frequency which is M times the fundamental frequency) synchronized with the pitch period of the input signal $a$ is obtained.

On the other hand, the fundamental frequency signal $c$ produced as output from the counter 21 is supplied to the 4-stage ring counter 26 and shifts the counter 26 successively for each period of the signal $c$. An output signal $d$ as indicated in FIG. 2(D) is obtained from a first output terminal 27a of the 4-stage ring counter 26 is applied as a gate control pulse to the gate 22 and, at the same time, after being phase inverted by a NOR circuit 28, is applied as a gate control pulse respectively to the gate 23 and a gate 29. Furthermore, an output signal $e$ as indicated in FIG. 2(E) obtained from a third output terminal 27c of the 4-stage ring counter 26 is applied as a gate control pulse to the gate 24 and, at the same time, after being phase inverted by a NOR circuit 30, is applied as a gate control pulse to the gate 25 and a gate 31. In addition, output signals of the second output terminal 27b and the fourth output terminal 27d of the 4-stage ring counter 26 are respectively fed to the NOR circuit 30 and a NOR circuit 28.

Each of the above mentioned gates 22, 23, 24, 25, 29 and 31 assumes an open state when the level of the applied gate control pulse is a high level to pass a signal and assumes a closed state when the level is a low level to block passage of a signal.

Accordingly, when the signal $d$ is of a high level, the gate 22 becomes open, and the signal of a frequency M times the above mentioned fundamental frequency obtained from the VCO 19 is passed through the gate 22 and an OR circuit 32 and then applied as a clock pulse $f$ as indicated in FIG. 2(F) to the memory device 12, which is thereby caused to carry out storing and reading out of one pitch period portion of the input signal $a$ from the input terminal 11. Since the output of the NOR circuit 28 at this time is at a low level, the gates 23 and 29 are closed, and the clock pulse from the counter 20 and the read-out signal of the memory device 12 are cut off.

Then, when the signal $d$ becomes a signal of low level, the gate 22 becomes closed, and the output of the NOR circuit 28 becomes high level, whereupon the gate 29 becomes open. Consequently, the clock pulse of a frequency M/2 times the fundamental frequency from the counter 20 passes through the gate 23 and the OR circuit 32 to be applied to the memory device 12, which is thereby caused to carry out storing and reading-out at a speed which is one half of that at the time of the above mentioned storing. The signal thus read out from the memory device 12 passes through the gate 29 and is supplied as a signal $h$ as indicated in FIG. 2(H) to an addition circuit 34.

When a time period corresponding to two pitch periods elapses from the time the signal $d$ assumes a low level, the output signal of the output terminal 27d supplied to the NOR circuit becomes high level. For this reason, the output of the NOR circuit 28 assumes a low level, and the gates 23 and 29 become closed. Consequently, through the gate 29, only a signal which has been read out from the memory device 12 at half the speed at the time of storing and expanded to a value corresponding to two pitch periods passes.

In a similar manner, when the signal $e$ is of high level, the gate 24 becomes open, and the memory device 13 is caused to carry out storing and reading-out at a frequency M times the fundamental frequency by a clock pulse $g$ supplied through an OR circuit 33. At this time, the output of the NOR circuit 30 is at a low level, and the gates 25 and 31 are closed, whereby the clock pulse from the counter 20 and the read-out signal from the memory device 13 are cut off.

Then, when the signal $e$ assumes a low level, the gate 24 becomes closed, and the gates 25 and 31 become open. Consequently, the memory device 13 carries out storing and reading-out at half the speed at the time of storage, and this signal thus read out passes through the gate 31 and is supplied to the above mentioned addition circuit 34. Furthermore, when a time period corresponding to two pitch periods elapses from the time the signal $e$ becomes one of low level, the gates 25 and 31 become closed.

In this manner, each of the memory devices 12 and 13 alternately repeats the operations of storing in accordance with a clock pulse of a frequency M times the fundamental frequency and of reading-out in accordance with a clock pulse of a frequency M/2 times the fundamental frequency. Here, since the frequency of the read-out clock pulse is one-half of the storing clock pulse frequency, an output signal $j$ which is continuous and, moreover, has been time expanded as indicated in FIG. 2(J) is led out through an output terminal 35 as a result of the input signal $a$, which has been time compressed to one-half at the time of recording by being reproduced at a tape speed which is twice that at the time of recording, as described above, being stored and read out by the memory devices 12 and 13.

In actual practice, each of the read-out output signals $h$ and $i$ of the memory devices 12 and 13 has a higher harmonic component due to sampling, but this harmonic component is removed by band limitations due to the existence of components such as an amplifier and loudspeaker connected in the system after the output terminal 35. For this reason, the waveform shown in FIG. 2(J) indicates only a waveform of a signal from which the above mentioned harmonic component has been removed, and which has been read out.

Since storing and reading out of a signal is carried out in synchronism with the pitch period, as described above, the phase relationship between the output signals $h$ and $i$ of the memory devices 12 and 13 is equal to the phase relationship between the original audio signals. Consequently, the signals $h$ and $i$ are connected smoothly without disturbance of periodicity. Thus, a reproduced audio signal $j$ of good tone quality without discontinuity which has the same Formant frequency and pitch period as in the case where a recorded signal is reproduced with the tape traveling at the same speed as that at the time of recording, and which, moreover, has an expanded time scale, is led out through the output terminal 35.

While, in the above embodiment, the case where an input signal which has been time compressed to one-half is expanded has been described, the invention is not thus limited, expansion with respect to input signals which have been time compressed in any manner being possible. In such a case, it is necessary that the frequency of the storing clock pulse be higher than the frequency of the reading out clock pulse. Furthermore, it is also possible to compress an input signal which has been time expanded. In this case, time compression is accomplished by selecting the frequency of the read-out clock pulse to the memory devices 12 and 13 at values higher than the storing clock pulse frequency and repeating a certain number of times the read-out signal, or by inserting blank parts between the read-out signals.

In order to combine a tape recorder and an apparatus in accordance with the system of the present invention, one measure is to provide an organization whereby, for example, a control operation for varying the storing clock pulse frequency and a tape speed regulating function of the tape recorder are caused to be interrelated in accordance with the degrees of time compression and expansion.

Furthermore, while with the use of a tape recorder with variable tape speed, time compression or expansion of the reproduced signal thereof is accomplished in the above described embodiment, the present invention is not thus limited. For example, it is also possible to process in real time the frequency correction of a submarine audio signal which has been frequency expanded.

In the above described embodiment, moreover, the memory devices 12 and 13 are adapted to store, respectively, one pitch period portion of an input audio signal, but they may be adapted to store two or more pitch period portions as a unit.

A second embodiment of the system of the invention will now be described with reference to the block schematic diagram thereof shown in FIG. 3, in which parts which are the same as corresponding parts in FIG. 1 are designated by like reference numerals. Detailed description of such parts will be omitted.

This system has a PLL 41 comprising the phase comparator 16, the DC amplifier 17, a low-pass filter 42, and a VCO 43. The signal $b$ from the band-pass filter 14 is fed to the phase comparator 16 and is compared with the signal $c$ from the VCO 43. The phase comparison error signal thus produced as output from the phase comparator 16 passes through the DC amplifier 17 and the low-pass filter 42, whose time constant is selected at a relatively low value, and, on one hand is fed to the VCO 43 to control its oscillation frequency, and the PLL 41 synchronizes with the frequency of the signal $b$.

On the other hand, the ripple component of the signal obtained from the low-pass filter 42 of the PLL 41 is removed by a low-pass filter 44 whose time constant has been selected at a relatively large value. Thereafter, the resulting signal is supplied to a VCO 45 to control the oscillation frequency thereof. Here, the VCO 45 is so selected that its oscillation frequency will become M times the fundamental frequency of the above mentioned signal $b$.

Since this VCO 45 is supplied with an analog voltage corresponding to a sychronizing frequency from the low-pass filter 44 of relatively large time constant as described above, the fluctuation (jitter) of the output signal frequency of the VCO 45 is very small. The output signal of the VCO 45 is supplied to the gates 22 and 24 and, at the same time, to the counter 20 to divide the frequency thereof to one-half. The output signal of the counter 20 is supplied to the gates 23 and 25 and, at the same time, to the counter 21, whose frequency is thereby divided to 2/M and is rendered into a frequency equal to the fundamental frequency of the signal $b$. The output signal of the counter 21 is supplied to the 4-stage ring counter 26.

The block arrangement and operation of the other parts are the same as those of the preceding first embodiment and, therefore, will not be described again.

Figure 3:
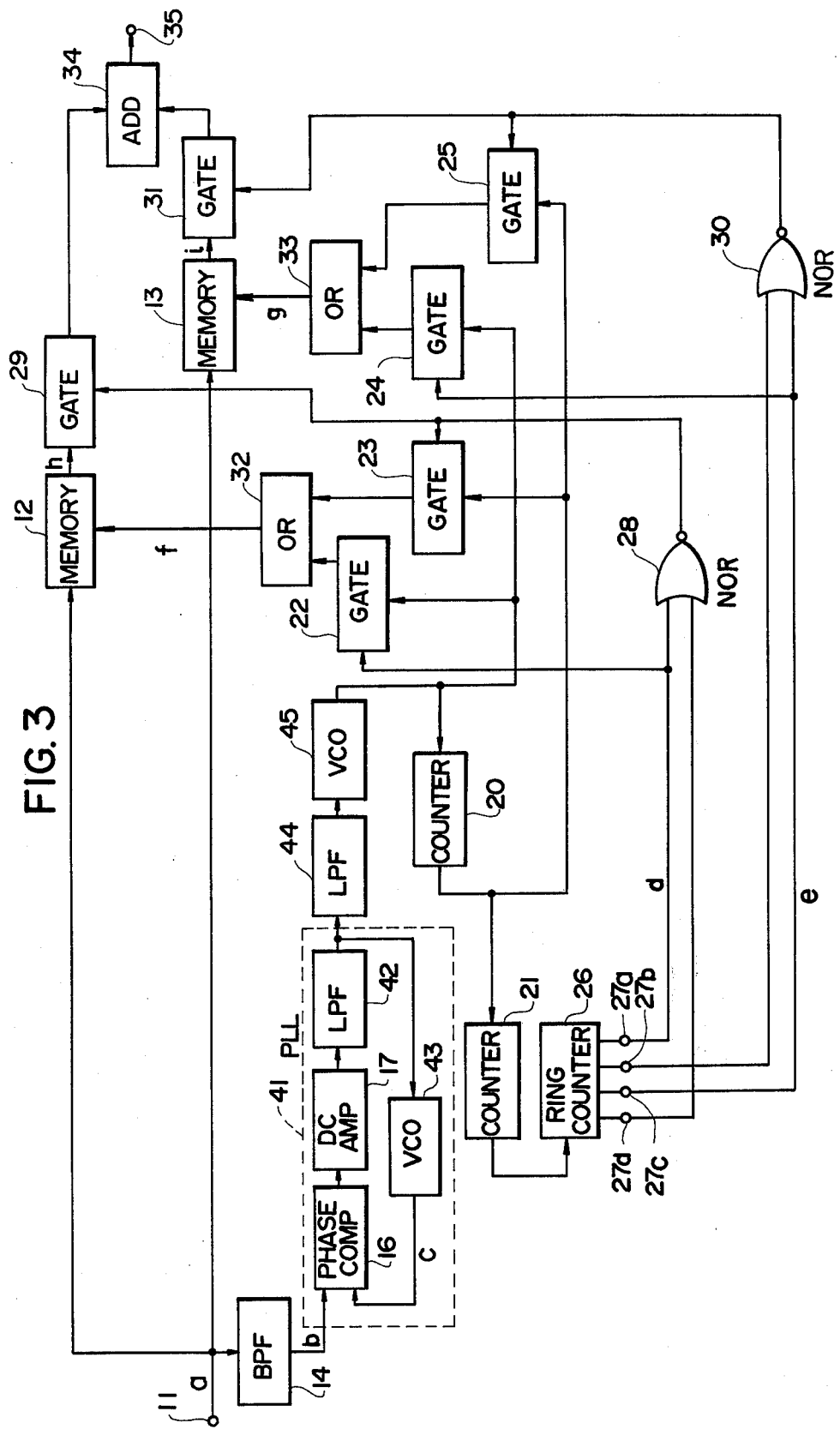
FIG. 3 is a block schematic diagram showing the essential organization of a second embodiment of the time compression and expansion system for audio signals according to the invention.

Next, a third embodiment of the system of the invention will be described with reference to FIG. 4, in which parts which are the same as corresponding parts in FIGS. 1 and 3 are designated by like reference numerals. Detailed description of such parts will not be repeated.

In each of the preceding first and second embodiments, a signal of a period $n$ remaining after withdrawal of an interval of a period $l = m - n$ is expanded and applied at the place of the length of the $m$ pitch period component of the reproduced audio signal. In this case, each of $l$, $m$, and $n$ is a positive integer. The frequency variation is given by the ratio $n/m$. Accordingly, the pitch and Formant of the synthetic audio signal which has been expanded become the same as those of the original signal when the frequency of the reproduced audio signal is $m/n$ times that of the original signal, that is, when the reproduction speed is $m/n$ times that in the normal case and, in terms of time compression rate, is $m/n$ times.

In each of the above described embodiments, for carrying out compression and expansion of the time length of a signal by taking the pitch period length as a unit, the compression and expansion rates are limited to ratios of integers thereof. Accordingly, in the case where expansion and compression of the length of a signal is carried out at every length of a number of pitch periods, there is a possibility of short sounds (or a part of the voice) being omitted, and, furthermore, an error arises in some cases at the time of extraction of an audio signal of pitch period length. This gives rise in some cases to a problem of deterioration to some extent in articulation and tone quality.

This problem is solved in a third embodiment of the system of the invention as described below.

Figure 5:
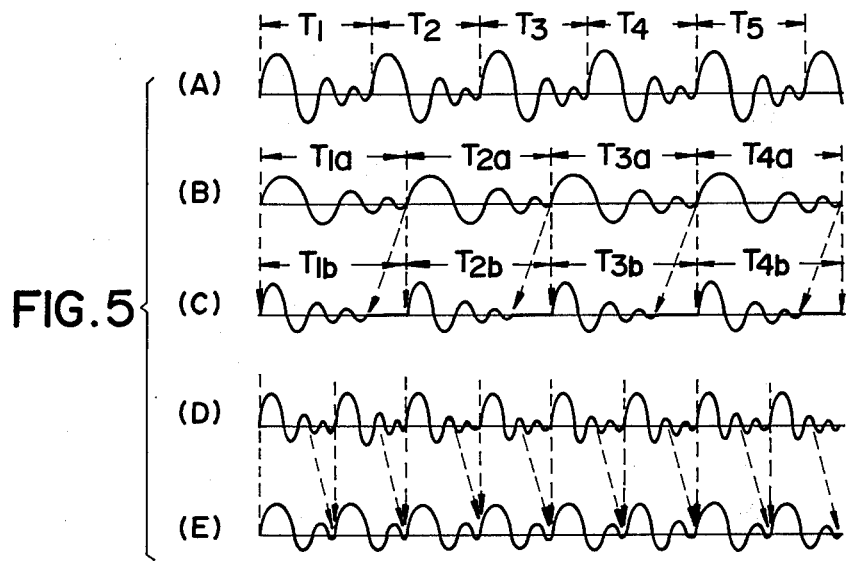

As one example, the case where a time expanded signal which has been reproduced by a tape recorder at a tape speed less than that at the time of recording is time compressed will be described. A time expanded signal as indicated in FIG. 5(B) is introduced through the input terminal 11 and supplied respectively to the memory devices 12 and 13 and the band-pass filter 14. The output signal of the band-pass filter 14 is fed to the PLL 41, and an analog voltage obtained from the PLL 41 in accordance with the frequency of the signal from the band-pass filter 14 is passed through the low-pass filter 44, where its ripple component is removed, and thereafter is supplied to the VCO 45 and a VCO 52 to control their respective oscillation frequencies.

In this case, the oscillation frequency of the VCO 45 is so selected that it will oscillate at a frequency which is M times the fundamental frequency of the signal from the band-pass filter 14, while the oscillation frequency of the VCO 52 is so selected that it will oscillate at a frequency which is $k$ times the oscillation frequency of the VCO 45, that is, at a frequency which is $kM$ times the above mentioned fundamental frequency. Here, $k$ is any real number and, in this case, is so selected that it is greater than one (unity) in order to accomplish time compression.

The frequency of the output signal of the VCO 45, which is M times the fundamental frequency is supplied to the gates 22 and 24 and, at the same time, is supplied to a base-M counter 51, where it is divided to 1/M. The output signal of the counter 51 of a frequency substantially equal to the fundamental frequency is supplied to the 4-stage ring counter 26. The output signal of the VCO 52 of a frequency $kM$ times the fundamental frequency is supplied to the gates 23 and 25 and also to a gate 54.

The signal of rectangular waveform obtained from the first output terminal 27a of the 4-stage ring counter 26 is supplied to the gate 23, and AND circuit 57, and an OR circuit 53 and, at the same, after being inverted by an inverter 59, is supplied to the gate 22. At the same time, the output signal of rectangular waveform the third output terminal 27c of the 4-stage ring counter is supplied to the gate 25, and AND circuit 58, and an OR circuit 53 and, at the same time, after being inverted by an inverter 60, is supplied to the gate 24. Each of these output signals of the output terminals 27a and 27c of the 4-stage ring counter 26 in this case has a pulse width which is one-fourth of its period and a frequency substantially equal to the above mentioned fundamental frequency.

When the output signal from the output terminal 27a of the 4-stage ring counter 26 is of high level, the output signal from the output terminal 27c is of low level, whereby the gates 23 and 24 becomes open, while the gates 22 and 25 become closed. Consequently, the output signal of the VCO 52 passes through the gate 23 and the OR circuit 32 and is applied as a clock pulse for reading out to the memory device 12, and the audio signal which has been stored in the memory device 12 is read out at a speed which is $k$ times the speed at the time of storing. On the other hand, the output signal of the VCO 45 passes through the gate 24 and the OR circuit 33 and is applied as a clock pulse for storing to the memory device 13, which thereupon stores a one pitch period portion of the audio signal from the input terminal 11.

Similarly, when the output signal from the output terminal 27a of the 4-stage ring counter 26 is of low level, and the output signal of the output terminal 27c is of high level, the memory device 12 carries out storing of one pitch period portion of the input audio signal, and the stored signal is read out from the memory device at $k$ times the speed at the time of storing.

On one hand, when either of the output signals from the output terminals 27a and 27c is of high level, a signal of high level is obtained from the OR circuit 53 and supplied respectively to the reset terminal of a base-M counter 56, the gate 54, and the set terminal of a flip-flop circuit 55. As a result, the base-M counter 56 is reset and, simultaneously receiving the clock pulse for reading out of the VCO 52 by way of the gate 54, begins to count this clock pulse. At the same time, the flip-flop circuit 55 is set and supplies a signal of high level to each of the AND circuits 57 and 58. When the above mentioned counter 56 counts $M(=512)$ pulses, which corresponds to one pitch period portion, of the clock pulses for reading out from the VCO 52, it applies a reset signal to the above mentioned flip-flop circuit 55 thereby to reset the same. Accordingly, in the case where the audio signal introduced through the input terminal 11 is a time expanded signal as indicated in FIG. 5(B), the gates 29 and 31 are respectively closed within the ON periods of the outputs from the output terminals 27a and 27c.

The signals read out alternately from the memory devices 12 and 13 at a speed $k$ times that at the time of storing are respectively passed through the gates 29 and 31 and supplied to the adding circuit 34. As a result, an output signal is led out of the output terminal 35 in a form, as indicated in FIG. 5(C), wherein the pitch period length is equal to that of the input time expanded signal, and, moreover, the Formant frequency has been expanded and restored to that of the original audio signal as indicated in FIG. 5(A).

In each of the blank portions of time which occur at this time, a signal of zero level, for example, as indicated in FIG. 5(C) is inserted and connected to the signal of the succeeding period interval. Accordingly, as indicated in FIG. 5(C), the signal is compressed and restored in each period of the input time expanded signal. For example, the period $T_1a$ is compressed and restored to $T_1b$, the period $T_2a$, to $T_2b$, and so forth, as indicated in FIGS. 5(B) and 5(C).

On the other hand, in the case where a time compressed signal which has been compressed with an arbitrary time compression rate as indicated in FIG. 5(D) is expanded and restored, the oscillation frequency of the VCO 52 is set at a value lower than the output oscillation frequency of the VCO 45 by selecting the frequency transmission coefficient of the VCO 52 in accordance with the above mentioned time compression rate. Here, $0 < k < l$. That is, the frequency of the clock pulse for storing is selected to be relatively higher than the frequency of the clock pulse for reading out.

As a consequence, an input time compressed signal is stored in the memory devices 12 and 13 for each one pitch period portion, but before the reading out of this one pitch period portion thus stored, that is, before the counter 56 finishes counting M=512 pulses, the output from the output terminals 27a and 27c are cut off, and for this reason, the gates 29 and 31 are closed.

Consequently, the signal led out of the output terminal 35 becomes a signal wherein the extreme trailing part of the stored signal is removed as indicated in FIG. 5(E), but the Formant frequency is compressed and restored and is transformed into a signal whose frequency is substantially equal to the Formant frequency of the original signal indicated in FIG. 5(A). In this case, however, the pitch period of the expanded and restored signal indicated in FIG. 5(E) is substantially equal to the pitch period of the input time compressed signal indicated in FIG. 5(D), and, moreover, the trailing part of the signal of the one pitch period portion which has been expanded is connected to the leading part of the succeeding signal by being overlapped thereon or by being removed.

In this connection, as is well known, the greater part of an audio signal is made up of voiced sound, which is a continuous repetition of damped oscillation. Accordingly, in the case, for example, where a time compressed signal is expanded and restored, it is desirable that parts of large amplitude, which are important for voice recognition, be prevented from being cut off and that, moreover, noise due to signal connection be minimized by making each signal connection as much as possible at the trailing part of damped oscillation of small amplitude.

In the processing of an audio signal in conformance with its pitch period, there is a possibility of impairment of important parts of the audio signal, for example, parts of large amplitude, depending on variation of pitch, and it becomes impossible in some cases to establish signal connections at parts of small amplitude.

This problem is solved in a fourth embodiment of the system of the invention as described below with reference to FIG. 6, in which parts which are the same as corresponding parts in FIG. 4 are designated by like reference numerals. Detailed description of such parts will not be repeated.

A signal of fundamental frequency as indicated in FIG. 7(B) obtained from a filter 61 actually has a phase delay relative to an input audio signal as indicated in FIG. 7(A) introduced through the input terminal 11. The output signal of the filter 61 is subjected to clipping by a clipping circuit 62 and is supplied as a signal of the waveform shown in FIG. 7(C) to the phase comparator 16 of the PLL 41, where it is phase compared with the output oscillation frequency of the VCO 43. The phase comparator 16, DC amplifier 17, low-pass filter 42, and VCo 43 constitute the PLL 41. The output oscillation signal of the VCo 43 is supplied to the phase comparator 16 and, at same time, is supplied to the ring counter 26.

The phase of the signal fed back from the VCO 43 to the phase comparator 16 in this case has a phase delay of the order of $\pi/2 \pm \pi/4$ (rad.) in the synchronous range of the PLL 41 relative to the phase of the signal as indicated in FIG. 7(C) supplied to the phase comparator 16 by way of the filter 14 and the clipping circuit 62 as indicated in FIG. 7(D). The quantity of this phase delay varies somewhat in accordance with difference in the synchronous frequency from the free running oscillation frequency of the VCO 43, and for this reason the phase of the signal from the VCO 43 to the phase comparator 16 also varies as indicated in FIG. 7(D).

Accordingly, in this embodiment, with aim of correcting the above described variations in the phase characteristics, phase characteristics in which the phase delay of the signal indicated in FIG. 7(C) due to the filter 61 and the phase delay of the signal indicated in FIG. 7(D) from the VCO 43 to the phase comparator 16 are respectively combined and caused to be any constant value irrespective of variations of the pitch frequency of the input audio signal.

The phase delay of the signal indicated in FIG. 7(D) is of the order $\pi/2 \pm \pi/4$ (rad.) as indicated by curve I in FIG. 8. In comparison, for a filter for imparting a phase advance of this range, there is a primary high-pass filter having a phase advance characteristics as indicated by curve II in FIG. 8. Accordingly, the combined phase characteristic of the above mentioned two characteristics becomes a characteristic which is substantially flat with respect to frequency as indicated by curve III in FIG. 8. Then, by adding a filter (phase shifter) of any ordinary type with flat phase characteristic to this high-pass filter, a combined phase characteristics as indicated by curve IV in FIG. 8 is obtained. Furthermore, by adding a low-pass filter or a band-pass filter of flat phase characteristic within the passing frequency band of the filter 61, a combined phase characteristic as indicated by curve V in FIG. 8 is obtained.

That is, when the filter 61 is constituted by, for example, a primary high-pass filter of the characteristic as indicated by curve II in FIG. 8, the above mentioned phase shifter, and the above mentioned low-pass filter or band pass filter, it is possible to obtain a fundamental frequency signal of a phase as indicated, for example, in FIG. 7(B) from this filter 61. Therefore, a timing signal of a flat phase characteristic as indicated by FIG. 7(E) can be obtain as indicated by curve V in FIG. 8, for example, from VCO 43 irrespective of variations of pitch frequency of the input audio signal.

Then, by adjusting the phase shifter of the filter 61, the falling part of the timing signal is caused to settle in the vicinity of the zero point before the maximum amplitude of the input audio signal as indicated in FIG. 7(E), and this falling part is used for the changeover between storing and reading out of the memory devices 12 and 13 for frequency restoration. As a result, an input audio signal from the point of maximum amplitude of the input audio signal indicated in FIG. 7(A) or a point in the vicinity of the zero point slightly short thereof is stored in the memory devices 12 and 13.

Therefore, in the case where, for example, a time compressed signal is expanded and restored by timing signal as indicated in FIG. 7(E), the expanded and restored signals read out from the memory devices 12 and 13 become such that they are always cut off from the trailing part of the damped oscillation wave in accordance with the time compression rate. As a result, the parts of large amplitude are not cut off, and an audio signal which is connected at parts of small amplitude is obtained.

Further, this invention is not limited to these embodiments but various variations and modifications may be made without departing from the scope and spirit of the invention.

What is claimed is:

1. A system for time compression and expansion of voice signals operating cooperatively with an apparatus for reproducing a tempo $p$ times the tempo at the time of recording, $p$ being a number which is not equal to one, said system comprising:

first and second shift registers having a predetermined number of elements;

means for supplying to said first and second shift registers a voice signal reproduced by the apparatus;

filtering means responsive to the voice signal for selectively passing the fundamental frequency component of the voice signal;

means responsive to the output signal of said filtering means for producing a first clock pulse signal having a frequency a predetermined number times the frequency of the fundamental frequency component and a second clock pulse signal having a frequency $1/p$ times the frequency of the first clock pulse signal, respectively, in synchronism with the output signal of said filtering means;

ring counter means for producing control pulse signals in synchronism with the output signal of said filtering means such a manner that the control pulse signals have a pulse width corresponding to the frequency of the fundamental frequency component and the phases of the control pulse signals are different with each other;

first gating means for passing the first clock pulse signal therethrough to apply to said first and second shift registers;

second gating means for passing the second clock pulse signal therethrough to apply to said first and second shift registers;

third gating means for passing the output signals of the first and second shift registers therethrough;

control means responsive to the control pulse signals for controlling the passing periods of the first, second and third gating means to alternately apply the first clock pulse signal to said first and second shift registers and alternately apply the second clock pulse signal to said first and second shift registers such that said first and second shift registers alternately receive the first clock pulse signal and the second clock pulse signal, and said third gating means passes the output signal of the first shift register only during periods in which the first shift register receives the second clock pulse signal and passes the output signal of the second shift register only during periods in which the second shift register receives the second clock pulse signal; the passing period for said first gating means being equal to the time interval corresponding to the pulse width of the control pulse signals; and means for extracting a voice signal which has passed through said third gating means as a time compressed or expanded signal.

2. A system as claimed in claim 1 in which the first and second clock pulse signals producing means comprises:

phase locked loop means including phase comparator means supplied with the output signal of said filtering means, voltage controlled oscillator means for oscillating at an oscillation frequency controlled by the output signal of said pulse comparator means to be equal to a frequency the predetermined number times the frequency of the fundamental frequency component of the voice signal, first counter means responsive to the oscillation output of said voltage controlled oscillator means for producing the second clock pulse signal, and second counter means responsive to the second clock pulse signal for producing a pulse signal having a frequency equal to the frequency of the fundamental frequency component and for supplying the pulse signal to said phase comparator means; the oscillation output of said voltage controlled oscillator means being the first clock pulse signal; said ring counter means producing the control pulse signals in response to the output pulse signal of said second counter means.

3. A system as claimed in claim 1 in which the first the second clock pulse signals producing means comprising:

phase locked loop means including phase comparator means supplied with the output signal of said filtering means, and first voltage controlled oscillator means for oscillating at an oscillation frequency controlled by the output signal of said phase comparator means to be equal to the frequency of the fundamental frequency component and supplying the oscillation output thereof to said phase comparator means;

second voltage controlled oscillator means for oscillating at an oscillation frequency controlled by the output signal of said phase comparator means to be equal to a frequency the predetermined number times the frequency of the fundamental frequency component of the voice signal, the oscillation output of said second voltage controlled oscillator means being the first clock pulse signal;

first counter means responsive to the oscillation output of said second voltage controlled oscillator means for producing the second clock pulse signal; and second counter means responsive to the second clock pulse signal for producing a pulse signal having a frequency equal to the frequency of the fundamental frequency component;

said ring counter means producing the control pulse signals in response to the output signal of said second counter means.

4. A system as claimed in claim 3 which further comprises low-pass filter means of a relatively large time constant connected between the output side of said phase means and said second voltage controlled oscillator means for removing ripple components from the output signal of said phase comparator means to control the oscillation frequency of said second voltage controlled oscillator means by the output signal of said low-pass filter means.

5. A system as claimed in claim 1 in which the first and second clock pulse signals producing means comprises:

phase locked loop means including phase comparator means supplied with the output signal of said filtering means, and first viltage controlled oscillator means for oscillating at an oscillation frequency controlled by the output signal of said phase comparator means to be equal to the frequency of the fundamental frequency component of the voice signal and supplying the oscillation output thereof to said phase comparator means;

second voltage controlled oscillator means for oscillating at an oscillation frequency controlled by the output signal of said phase comparator means to be equal to a frequency the predetermined number times the frequency of the fundamental frequency component of the voice signal, the oscillation output of said second voltage controlled oscillator means being the first clock pulse signal;

third voltage controlled oscillator means for oscillating at an oscillation frequency controlled by the output signal of said phase comparator means to be equal to a frequency $1/p$ times the oscillation frequency of said second voltage controlled oscillator means, the oscillation output of said third voltage controlled oscillator means being the second clock pulse signal; and counter means responsive to the first clock pulse signal for producing a pulse signal having a frequency equal to the frequency of the fundamental frequency component;

said ring counter means producing the control pulse signals in response to the output pulse of said counter means.

6. A system as claimed in claim 1 in which the first and second clock pulse signals producing means comprises:

phase locked loop means including phase comparator means supplied with the output signal of said filtering means, and first voltage controlled oscillator means for oscillating at an oscillation frequency controlled by the output signal of said phase comparator means to be equal to the frequency of the fundamental frequency component of the voice signal and supplying the oscillation output thereof to said phase comparator means;

second voltage controlled oscillator means for oscillating at an oscillation frequency controlled by the output signal of said phase comparator means to be equal to a frequency the predetermined number times the frequency of the fundamental frequency component of the voice signal, the oscillation output of said second voltage controlled oscillator means being the first clock pulse signal; and third voltage controlled oscillator means for oscillating at an oscillation frequency controlled by the output signal of said phase comparator means to be equal to a frequency $1/p$ times the oscillation frequency of said second voltage controlled oscillator means, the oscillation output of said third voltage controlled oscillator means being the second clock pulse signal;

said ring counter means producing the control pulse signals in response to the oscillation output of said first voltage controlled oscillator means.

7. A system as claimed in claim 6 in which said filtering means has a phase characteristic in which phase shift is substantially constant irrespective of variations of the frequency of the fundamental frequency component of the voice signal.

* * * * *